United States Patent [19]

Simons et al.

[11] Patent Number: 5,391,443
[45] Date of Patent: Feb. 21, 1995

[54] PROCESS FOR THE EXTRACTION OF SPECTRAL IMAGE RECORDS FROM DYE IMAGE FORMING PHOTOGRAPHIC ELEMENTS

[75] Inventors: Michael J. Simons, Eastcote, United Kingdom; James E. Sutton, Rochester, N.Y.

[73] Assignee: Eastman Kodak Company, Rochester, N.Y.

[21] Appl. No.: 966,623

[22] Filed: Oct. 26, 1992

Related U.S. Application Data

[63] Continuation-in-part of Ser. No. 905,053, Jun. 26, 1992, abandoned.

[30] Foreign Application Priority Data

Jul. 19, 1991 [GB] United Kingdom ............... 9115620

[51] Int. Cl.$^6$ ........................... G03F 3/10; G03C 7/24
[52] U.S. Cl. ........................ 430/21; 430/373; 430/363; 430/364; 430/503; 430/506; 358/526; 358/480
[58] Field of Search ................... 430/21, 22, 363, 364, 430/503, 506, 373; 358/80, 52, 480

[56] References Cited

U.S. PATENT DOCUMENTS

| | | | |
|---|---|---|---|
| 2,119,323 | 5/1938 | Gaspar | 430/364 |
| 3,324,764 | 6/1967 | Altman | 430/356 |
| 4,216,285 | 8/1980 | Miller | 430/364 |
| 4,222,777 | 9/1980 | Nakajima et al. | 430/363 |
| 4,414,305 | 11/1983 | Nakamura et al. | 430/373 |
| 4,418,358 | 11/1983 | Poetsch et al. | 358/80 |
| 4,439,520 | 3/1984 | Kofrow et al. | 430/503 |
| 4,469,780 | 9/1984 | Hirai et al. | 430/373 |
| 4,543,308 | 9/1985 | Schumann et al. | 430/21 |
| 4,636,845 | 1/1987 | Alkofer | 358/80 |
| 4,777,102 | 10/1988 | Levine | 430/21 |
| 4,788,131 | 11/1988 | Kellogg et al. | 430/21 |
| 4,818,649 | 4/1989 | Brodie et al. | 430/21 |
| 4,818,663 | 4/1989 | Powers et al. | 430/506 |
| 4,923,788 | 5/1990 | Shuttleworth et al. | 430/507 |
| 4,943,517 | 7/1990 | Powers et al. | 430/363 |
| 4,954,425 | 9/1990 | Iwamo | 430/373 |
| 5,051,341 | 9/1991 | Muenter et al. | 430/357 |
| 5,200,301 | 4/1993 | Wingender et al. | 430/364 |
| 5,215,875 | 6/1993 | Matejec et al. | 430/373 |

FOREIGN PATENT DOCUMENTS 1458370 12/1976 United Kingdom .

OTHER PUBLICATIONS

James "Theory of the Photographic Process" pp. 536–546 & 566–568 ©1977.

*Primary Examiner*—Charles L. Bowers, Jr.
*Assistant Examiner*—Martin Angebranndt
*Attorney, Agent, or Firm*—Carl O. Thomas

[57] ABSTRACT

A method is disclosed of extracting independent spectral image records from an imagewise exposed photographic element that contains superimposed silver halide exposure recording layer units each containing a latent image derived from a selected region of the spectrum. The photographic element contains N+1 superimposed silver halide exposure recording units. Photographic processing is conducted to produce a silver image in N+1 of the exposure recording units and a dye image distinguishable from other dye images in at least N exposure recording layer units. The photographic element is in one instance scanned in a spectral region of silver absorption and minimal image dye absorption to provide a first image density record, and the photographic element is also in N spectral regions wherein maximum density of a different image dye occurs to provide N additional image density records. Information from the separate image density records is converted to N+1 image records each corresponding to a different latent image in the exposed photographic element.

26 Claims, No Drawings

PROCESS FOR THE EXTRACTION OF SPECTRAL IMAGE RECORDS FROM DYE IMAGE FORMING PHOTOGRAPHIC ELEMENTS

This is a continuation-in-part of U.S. Ser. No. 905,053, filed Jun. 26, 1992, now abandoned.

FIELD OF THE INVENTION

The invention is directed to a method of extracting multiple image records from an imagewise exposed silver halide photographic element.

Background

In classical black-and-white photography a photographic element containing a silver halide emulsion layer coated on a transparent film support is imagewise exposed to light. This produces a latent image within the emulsion layer. The film is then photographically processed to transform the latent image into a silver image that is a negative image of the subject photographed. Photographic processing involves developing (reducing silver halide grains containing latent image sites to silver), stopping development, and fixing (dissolving undeveloped silver halide grains). The resulting processed photographic element, commonly referred to as a negative, is placed between a uniform exposure light source and a second photographic element, commonly referred to as a photographic paper, containing a silver halide emulsion layer coated on a white paper support. Exposure of the emulsion layer of the photographic paper through the negative produces a latent image in the photographic paper that is a positive image of the subject originally photographed. Photographic processing of the photographic paper produces a positive silver image. The image bearing photographic paper is commonly referred to as a print.

In a well known, but much less common, variant of classical black-and-white photography a direct positive emulsion can be employed, so named because the first image produced on processing is a positive silver image, obviating any necessity of printing to obtain a viewable positive image. Another well known variation, commonly referred to as instant photography, involves imagewise transfer of silver ion to a physical development site in a receiver to produce a viewable transferred silver image.

In classical color photography the photographic film contains three superimposed silver halide emulsion layer units, one for forming a latent image corresponding to blue light (i.e., blue) exposure, one for forming a latent image corresponding to green exposure and one for forming a latent image corresponding to red exposure. During photographic processing developing agent oxidized upon reduction of latent image containing grains reacts to produce a dye image with silver being an unused product of the oxidation-reduction development reaction. Silver is removed by bleaching during photographic processing. The image dyes are complementary subtractive primaries—that is, yellow, magenta and cyan dye images are formed in the blue, green and red recording emulsion layers, respectively. This produces negative dye images (i.e., blue, green and red subject features appear yellow, magenta and cyan, respectively). Exposure of color paper through the color negative followed by photographic processing produces a positive color print. Again, bleaching removes developed silver that would otherwise blacken the color print.

In one common variation of classical color photography reversal processing is undertaken to produce a positive dye image in the color film (commonly referred to as a slide, the image typically being viewed by projection). In another common variation, referred to as color image transfer or instant photography, image dyes are transferred to a receiver for viewing.

In each of the classical forms of photography noted above the final image is intended to be viewed by the human eye. Thus, the conformation of the viewed image to the subject image, absent intended aesthetic departures, is the criterion of photographic success.

With the emergence of computer controlled data processing capabilities, interest has developed in extracting the information contained in an imagewise exposed photographic element instead of proceeding directly to a viewable image. It is now common practice to extract the information contained in both black-and-white and color images by scanning. The most common approach to scanning a black-and-white negative is to record point-by-point or line-by-line the transmission of a near infrared beam, relying on developed silver to modulate the beam. In color photography blue, green and red scanning beams are modulated by the yellow, magenta and cyan image dyes. In a variant color scanning approach the blue, green and red scanning beams are combined into a single white scanning beam modulated by the image dyes that is read through red, green and blue filters to create three separate records. The records produced by image dye modulation can then be read into any convenient memory medium (e.g., an optical disk). The advantage of reading an image into memory is that the information is now in a form that is free of the classical restraints of photographic embodiments. For example, age degradation of the photographic image can be for all practical purposes eliminated. Systematic manipulation (e.g., image reversal, hue alteration, etc.) of the image information that would be cumbersome or impossible to achieve in a controlled and reversible manner in a photographic element are readily achieved. The stored information can be retrieved from memory to modulate light exposures necessary to recreate the image as a photographic negative, slide or print at will. Alternatively, the image can be viewed as a video display or printed by a variety of techniques beyond the bounds of classical photography—e.g., xerography, ink jet printing, dye diffusion printing, etc.

Hunt U.K. 1,458,370 illustrates a color photographic element constructed to have three separate color records extracted by scanning. Hunt employs a classical color film modified by the substitution of a panchromatic sensitized silver halide emulsion layer for the green recording emulsion layer. Following imagewise exposure and processing three separate records are present in the film, a yellow dye image recording blue exposure, a cyan dye image recording red exposure and a magenta dye image recording exposure throughout the visible spectrum. These three dye images are then used to derive blue, green and red exposure records, but the photographic element itself is not properly balanced to be used as a color negative is classically used for photographic print formation.

A number of other unusual film constructions have been suggested for producing photographic images intended to be extracted by scanning:

Kellogg et al U.S. Pat. No. 4,788,131 extracts image information from an imagewise exposed photographic element by stimulated emission from latent image sites of photographic elements held at extremely low temperatures. The required low temperatures are, of course, a deterrent to adopting this approach.

Levine U.S. Pat. No. 4,777,102 relies on the differential between accumulated incident and transmitted light during scanning to measure the light unsaturation remaining in silver halide grains after exposure. This approach is unattractive, since the difference in light unsaturation between a silver halide grain that has not been exposed and one that contains a latent image may be as low as four photons and variations in grain saturation can vary over a very large range.

Schumann et al U.S. Pat. No. 4,543,308 relies upon differentials in luminescence in developed and fixed color films to provide an image during scanning. Relying on differentials in luminescence from spectral sensitizing dye, the preferred embodiment of Schumann et al, is unattractive, since luminescence intensities are limited. Increasing spectral sensitizing dye concentrations beyond optimum levels is well recognized to desensitize silver halide emulsions.

Since silver halide photography has been in widespread use for imaging for well in excess of a century, it is not surprising that thousands of variant photographic element constructions have been disclosed. Robillard U.S. Pat. No. 4,320,193 discloses silver halide photographic elements intended to produce special chromatic effects without resorting to filters or unusual lighting. Robillard proposed omitting the dye image providing coupler from one layer of a color film or transposing the dye providing couplers within the color films. For example, instead of providing blue, green and red recording layer units containing yellow, magenta and cyan dye forming couplers, respectively, as is required to reproduce the subject image, the locations of the couplers are proposed to be exchanged within the film. Apart from the false color imaging noted, Robillard's approach conforms to classical color photography.

SUMMARY OF THE INVENTION

This invention has as its purpose to provide a method of extracting from a silver halide color photographic element independent image records representing imagewise exposures to different portions of the electromagnetic spectrum. More particularly, the invention is concerned with achieving this objective using color photographic film and processing that are simplified as compared to that required for classical color photography.

The present invention eliminates silver image bleaching. This eliminates the use of bleaching solutions in processing. Bleaching solutions contain metal ions that are subject to environmental protection regulations. The color film construction can also be simplified to contain one less image dye than required for comparable imaging in classical color photography.

Equally as important is that the simplifications can be realized by remaining within the bounds of proven film construction, processing and scanning capabilities.

In one aspect the invention is directed to a method of extracting independent spectral image records from an imagewise exposed photographic element that contains superimposed silver halide exposure recording layer units each containing a latent image derived from a selected region of the spectrum comprising (i) photographically processing the imagewise exposed photographic element to produce spectrally noncoextensive images, (ii) scanning the images produced by photographic processing, and (iii) deriving image records corresponding to the latent images from the scanned images, wherein (a) $N+1$ of the superimposed silver halide exposure recording units are present, N ranging from 1 to 9, (b) photographic processing is conducted to produce a silver image in $N+1$ of the exposure recording units and a dye image distinguishable from other dye images in at least N exposure recording layer units, (c) the photographic element is in one instance scanned in a spectral region of silver absorption and minimal image dye absorption to provide a first image density record, (d) the photographic element is also scanned in N spectral regions wherein maximum density of a different image dye occurs to provide N additional image density records, and (e) information from the separate image density records is converted to $N+1$ image records each corresponding to a different latent image in the exposed photographic element.

DESCRIPTION OF PREFERRED EMBODIMENTS

The invention is directed to a method of extracting independent spectral image records from an imagewise exposed photographic element that contains at least two and preferably at least three superimposed silver halide recording layer units each containing a latent image derived from a selected region of the spectrum.

The basic features of the invention can be appreciated by considering extracting two image records corresponding to two spectrally distinct latent images contained in an imagewise exposed silver halide photographic element satisfying Structure I:

| Structure I |
|---|
| First Recording Layer Unit |
| Second Recording Layer Unit |
| Photographic Support |

In a simple illustrative form the first and second recording layer units can each consist of a single silver halide emulsion layer. Any combination of emulsion layers can be employed that are capable of forming a latent image indicative of exposure in a different region of the spectrum. Differential spectral sensitivity can be imparted by employing different silver halides in the emulsion layers to impart different native sensitivity, by incorporating a spectral sensitizing dye in one layer or by incorporating spectral sensitizing dyes that absorb in different spectral regions in the two layers. Separation of the spectral response of the layers can also be extended by employing emulsion layers of unequal speed.

For example, if both recording layer units consist of silver bromoiodide emulsion layers, usually selected for camera speed imaging, the emulsion layers can be independently sensitized to green, red or near infrared (e.g., in the range of 800 to 1500 nm). Using silver chloride or chlorobromide emulsions, which lack appreciable native blue sensitivity, selective exposure can be extended also to the blue portion of the spectrum by incorporating a blue spectral sensitizing dye in one of the emulsion layers.

One of the two recording layer units must be capable of forming on processing a dye image corresponding to the latent image of the recording layer unit in which it is formed. The only essential requirement of the image dye is that its absorption profile be spectrally noncoextensive with that of developed silver. Silver has a broad band absorption profile extending throughout the visible and well into the near infrared portion of the spectrum. Conventional photographic imaging dyes have relatively narrow absorption profiles, with half maximum absorption widths (hereinafter also referred to as half-peak absorption bands) typically well below 100 nm. A dye image with a blue, green, red or near infrared absorption peak is specifically contemplated to be formed in one of the recording layer units during photographic processing. Image dye selection can be independent of the wavelengths of exposure recorded, but, for scanning without fixing, the image dye half-peak absorption band is preferably offset from the spectral region of recording layer unit sensitivity.

Preferred recording layer unit emulsions are negative-working emulsions and particularly negative-working silver bromoiodide emulsions. The dye image requirement is preferably satisfied by incorporating in one of the image recording layer units a dye-forming coupler. However, the invention is generally applicable to both positive or negative-working silver halide emulsions and to the full range of conventional approaches for forming dye images. *Research Disclosure*, Item 308119, published December 1989, (all cited sections of which are incorporated by reference) in Section I provides a summary of conventional emulsion grain features, in Section IX provides a summary of vehicles and vehicle extenders found in emulsion layers and other processing solution permeable layers, in Section II describes chemical sensitization, in Section III describes spectral sensitization, and in Section VII describes a wide selection of conventional dye image providing materials. *Research Disclosure* is published by Kenneth Mason Publications, Ltd., Emsworth, Hampshire P010 7DD, England. The photographic support in Structure I can take the form of any conventional transparent or reflective support. The inclusion in Structure I of other conventional photographic element features, such as one or more of the antifoggants and stabilizers summarized in Section VI, the hardeners summarized in Section X, the plasticizer and lubricants summarized in Section XII, the antistatic layers summarized in Section XIII and the matting agents summarized in Section XVI, conform to the routine practices of the art and require no detailed description.

The first step of the process of the invention is to process photographically Structure I after it has been imagewise exposed to produce a first latent image in the first recording layer unit indicative of exposure in one region of the spectrum and a second latent image in the second recording layer unit indicative of exposure to another region of the spectrum. Any conventional photographic processing can be undertaken that is capable of producing a silver image in one of the two recording layer units and a dye image in the other recording layer unit. In practice this can be most conveniently achieved by concurrently producing a silver image in both recording layer units and a dye image in one of the two recording layer units by conducting a conventional processing sequence used for silver halide color negative imaging, but with the conventional step of silver bleaching being omitted. The silver image in the recording layer unit containing the dye image is not required for extraction of the latent image information. It is, of course, also possible to form a second dye image concurrently with the two silver images and the first dye image. The presence of a second image dye is compatible with the practice of the invention, provided the first and second dye images exhibit spectrally shifted absorptions. However, a significant advantage of the present invention is that only N (where in Structure I N=1) image dyes are required to produce N+1 latent image records, allowing the structure of the photographic element to be simplified as compared to a conventional color photographic element being used to record two spectrally distinct images.

Conventional photographic processing of color photographic elements particularly suited to the practice of this invention (but with the bleaching step omitted) includes those summarized in Item 308119, cited above, Section XIX, particularly the color negative processing of sub-section F. There is little, if any, incentive to complicate processing with image reversal, since image reversal can be easily accomplished in a computer after the image information has been extracted from the photographic element. A typical sequence of steps includes development to produce the silver and dye images, stopping development and fixing to remove undeveloped silver halide. Usually washing is interposed between successive processing steps.

Fixing can be omitted where the photographic element is protected from unwanted post-development print out (radiation induced reduction of silver halide to silver) prior to or during scanning. If the photographic element is photographically processed, scanned under conditions that avoid print out and then discarded, processing can be simplified by omitting fixing. In this regard it should be pointed out that it is specifically recognized that the photographic elements can be scanned in a spectral region offset from their spectral sensitivity, since silver exhibits broad band absorption and, in a significant departure from classical color photography, the image dye can be chosen to absorb primarily outside the region of recording layer unit sensitivity. Thus, successive scans without fixing are possible without encountering print out.

After the dye and silver images are formed in the photographic element, the next step is to twice scan the photographic element to record pixel-by-pixel N+1 (in Structure I, N=1) image density records. One image density record is produced by scanning in a spectral region where image dye density is minimal, so that the image density record is primarily if not entirely the record of silver density. For example, scanning with a near infrared laser when the photographic element contains any one or a combination of yellow, magenta and cyan image dyes is entirely feasible.

The second image density record is produced by scanning in the spectral region of absorption of the image dye. Ideally there is a dye image in only one of the first and second recording layer units and a silver image in the other recording layer unit. In practice there are usually two silver images, one in each of the first and second recording layer units, that together form the first image density record. In this instance it is immaterial which recording layer unit contains the dye image to be scanned to form the second image density record. If two dye images are present and two silver images are present, either dye image can be scanned to form the second image density record. However, unlike the silver in the two recording layer units, both dye images cannot be merged in the second image density record. If two dye images are present, their absorptions are in different regions of the spectrum, allowing them to be separately or concurrently scanned.

The second image density record (which can be obtained by scanning before or after obtaining the first image density record) is obtained by scanning in the spectral region of image dye absorption. Optimally, this is at or near the peak absorption of the image dye, but good image discrimination can be obtained at any spectral location within the half peak absorption band of the image dye. The second image density record is a pixel-by-pixel record of the combined density of the image dye and the silver in the photographic element.

In the simplest case, that in which a silver image exists in only one recording layer unit, the silver image density record corresponds to the latent image of the recording layer unit in which the silver is located. The remaining image density record is dye plus silver and does not correspond to either of the recording layer unit latent images. By subtracting the silver image density record from the image dye plus silver image density record, a record of dye image density is created that corresponds to the latent image in the image dye containing recording layer unit. Note that since the image dyes absorb in different regions of the spectrum, it is immaterial whether one or both of the recording layer units contains an image dye, but it is important that the silver image and the scanned dye image be in different recording layer units.

It should be further noted that the explanation above assumes the same silver density within both spectral regions of scanning. Fortunately, the density of silver varies very little throughout the visible spectrum and in the near visible infrared. However, the absorption profile of developed silver is well known and, if greater precision is required, silver density adjustment by reference to that absorption profile requires no more than routine skill. For example, if silver absorption at the wavelength of silver image scanning is only 98 percent of silver absorption at the wavelength of dye image scanning, the observed silver density is increased by $S1/0.98$, where $S1$ is the silver density observed in the silver image scan at a particular pixel location, before subtracting the silver image density at that pixel location from the dye plus silver density observed at that same pixel location.

In the simplest to obtain and therefore preferred form of the invention two silver images are present in Structure I. In this instance both the silver image density scan and the dye plus silver image density scan contain information derived from both latent images. By again subtracting the silver image density scan from the dye plus silver image density scan pixel-by-pixel, one dye image density record which corresponds to one latent image record is obtained. By knowledge of the stoichiometric relationship between silver halide reduction to form silver and image dye produced (or destroyed) by oxidized developing agent produced by that oxidation-reduction reaction or by an empirically measured relationship between silver and dye density of a particular layer, the silver density can be calculated at each pixel based on the image dye density. By subtracting the calculated silver density from the silver density at each pixel observed by scanning, the silver density difference obtained by subtraction corresponds to the latent image in the recording layer unit not containing the image dye scanned. Thus, two separate records are obtained, each corresponding to the latent image in a different one of the two recording layer units.

Conventional scanning techniques satisfying the requirements described above can be employed and require no detailed description. It is possible to successively scan the photographic element within each of the wavelength ranges discussed above or to combine in one beam the different wavelengths and to resolve the combined beam into separate image density records by passing different portions of the beam through separate filters which allow transmission within only the spectral region corresponding to the image density record sought to be formed. A simple technique for scanning is to scan the photographically processed Structure I point-by-point along a series of laterally offset parallel scan paths. When the photographic support is transparent, as is preferred, the intensity of light passing through the photographic element at a scanning point is noted by a sensor which converts radiation received into an electrical signal. Alternatively, the photographic support can be reflective and the sensed signal can be reflected from the support. The electrical signal is passed through an analogue to digital converter and sent to memory in a digital computer together with locant information required for pixel location within the image. Except for the wavelength(s) chosen for scanning, successive image density scans, where employed, can be identical to the first. The pixel-by-pixel density adjustments and subtractions are routine data manipulations within the computer resulting in the two sought image records corresponding to the latent images in the first and second recording layer units.

Once the two image records corresponding to the two latent images have been obtained, the original image or selected variations of the original image can be reproduced at will. The simplest approach is to use two lasers to expose pixel-by-pixel a conventional color paper. Simpson et al U.S. Pat. No 4,619,892 discloses differentially infrared sensitized color print materials particularly adapted for exposure with near infrared lasers. Instead of producing a viewable hard copy of the original image the image information can instead be fed to a video display terminal for viewing or fed to a storage medium (e.g., an optical disk) for archival storage and later viewing.

One of the challenges encountered in producing images from information extracted by scanning is that the number of pixels of information available for viewing is only a fraction of that available from a comparable classical photographic print. It is therefore even more important in scan imaging to maximize the quality of the image information available. Enhancing image sharpness and minimizing the impact of aberrant pixel signals (i.e., noise) are common approaches to enhancing image quality. A conventional technique for minimizing the impact of aberrant pixel signals is to adjust each pixel density reading to a weighted average value by factoring in readings from adjacent pixels, closer adjacent pixels being weighted more heavily. Although the invention is described in terms of point-by-point scanning, it is appreciated that conventional approaches to improving image quality are contemplated. Illustrative systems of scan signal manipulation, including techniques for maximizing the quality of image records, are disclosed by Bayer U.S. Pat. No. 4,553,165, Urabe et al U.S. Pat. No. 4,591,923, Sasaki et al U.S. Pat. No. 4,631,578, Alkofer U.S. Pat. No. 4,654,722, Yamada et al U.S. Pat. No. 4,670,793, Klees U.S. Pat. No. 4,694,342, Powell U.S. Pat. No. 4,805,031, Mayne et al U.S. Pat. No. 4,829,370, Abdulwahab U.S. Pat. No.

4,839,721, Matsunawa et al U.S. Pat. Nos. 4,841,361 and 4,937,662, Mizukoshi et al U.S. Pat. No. 4,891,713, Petilli U.S. Pat. No. 4,912,569, Sullivan et al U.S. Pat. No. 4,920,501, Kimoto et al U.S. Pat. No. 4,929,979, Klees U.S. Pat. No. 4,962,542, Hirosawa et al U.S. Pat. No. 4,972,256, Kaplan U.S. Pat. No. 4,977,521, Sakai U.S. Pat. No. 4,979,027, Ng U.S. Pat. No. 5,003,494, Katayama et al U.S. Pat. No. 5,008,950, Kimura et al U.S. Pat. No. 5,065,255, Osamu et al U.S. Pat. No. 5,051,842, Lee et al U.S. Pat. No. 5,012,333, Sullivan et al U.S. Pat. No. 5,070,413, Bowers et al U.S. Pat. No. 5,107,346, Telle U.S. Pat. No. 5,105,266, MacDonald et al U.S. Pat. No. 5,105,469, and Kwon et al U.S. Pat. No. 5,081,692, the disclosures of which are here incorporated by reference.

Structure I has the capability of faithfully producing four different image hues, a first image hue reflecting exposure of the first recording layer unit, a second image hue reflecting exposure of the second recording layer unit, a combination of the first and second image hues reflecting varied exposures of both recording layer units, and a fourth hue corresponding to the absence of exposure of either recording layer unit.

The simplest imaging systems capable of replicating photographic subjects presenting chromatic information throughout the visible spectrum employ at least three spectrally restricted image records. Therefore, for the majority of imaging applications a photographic element like Structure I, but with a third recording layer unit is preferred. This photographic element is hereinafter referred to as Structure II. The first, second and third recording layer units must be responsive to three separate portions of the visible spectrum, each must be capable of producing a silver image corresponding to the latent image, and at least two of the recording layer units must be capable of producing spectrally noncoextensive dye images. To avoid needless repetition an extended description of the general features of Structure II is omitted. The general requirements of Structure II can be readily appreciated from the general description of Structures I and II above and the description that follows of a specific preferred embodiment of Structure II. Conversely, specific preferred forms of Structure I can be recognized as variants of the preferred embodiments of Structure II, but with one of the recording layer units omitted.

In a specific, preferred form Structure II can be constructed as follows:

---
Structure II
(a preferred form)
---
Blue Recording Layer Unit
Interlayer #1
Green Recording Layer Unit
Interlayer #2
Red Recording Layer Unit
Transparent Film Support
Antihalation Layer
---

In its preferred form Structure II is constructed like a conventional silver halide color negative film intended to be used for printing onto a color paper, except that only two of the blue, green and red recording layer units are capable of forming a dye image on photographic processing.

In a specifically preferred form dye-forming couplers are present in two of the three recording layer units. Couplers capable of forming yellow, magenta, cyan and near infrared absorbing dyes on development are preferred. The couplers forming yellow, magenta and cyan dyes are preferred, since a large selection of photographically optimized couplers of these types are known and in current use in silver halide photography (refer to Research Disclosure, Item 308119, Section VII, cited above, and to James *The Theory of the Photographic Process*, 4th Ed., Macmillan, New York, 1977, Chapter 12, Section III, pp. 353–363). Couplers capable of forming near infrared absorbing image dyes are preferred, since the more efficient solid state lasers, useful in scanning, emit in the near infrared. Examples of infrared absorber dye forming couplers are contained in Ciurca et al U.S. Pat. No. 4,178,183.

The preferred silver halide emulsions are silver bromoiodide negative-working emulsions. Negative-working emulsions are preferred, since they are simpler both in their structure and photographic processing. Silver bromoiodide grain compositions provide the most favorable relationship of photographic sensitivity (speed) to granularity (noise) and are generally preferred for camera speed (>ISO 25) imaging. While any conventional iodide level can be employed, only low levels of iodide are required for increased sensitivity. Iodide levels as low as 0.5 mole percent, based on total silver are contemplated in preferred embodiments. The high levels of iodide conventionally relied upon for development inhibition to optimize the dye image are not required or preferred, since iodide retards the rate of development. Relatively rapid (less than 1 minute from exposed film input to dry negative) rates of photographic processing can be realized when the iodide level is maintained below 5 (optimally below 3) mole percent, based on total silver. Although the preferred emulsions are referred to as silver bromoiodide emulsions, it is appreciated that minor amounts of chloride can be present. For example, silver bromoiodide grains that are epitaxially silver chloride sensitized are specifically contemplated. Examples of such emulsions are provided by Maskasky U.S. Pat. Nos. 4,435,501 and 4,463,087.

Optimum photographic performance is realized when the silver bromoiodide emulsions are tabular grain emulsions. As employed herein the term "tabular grain emulsion" refers to an emulsion in which greater than 50 percent (preferably greater than 70 percent) of the total grain projected area is accounted for by tabular grains. For the green and red recording layer units preferred tabular grain emulsions are those in which the projected area criterion above is satisfied by tabular grains having a thickness of less than 0.3 $\mu$m (optimally less than 0.2 $\mu$m), an average aspect ratio (ECD/t) of greater than 8 (optimally greater than 12), and/or an average tabularity (ECD/$t^2$) of greater than 25 (optimally greater than 100), where ECD is the mean equivalent circular diameter and t is the mean thickness of the tabular grains, both measured in micrometers ($\mu$m). Specific examples of preferred silver bromoiodide emulsions include *Research Disclosure*, Item 22534, January 1983; Wilgus et al U.S. Pat. No. 4,434,426; Kofron et al U.S. Pat. No. 4,439,520; Daubendiek et al U.S. Pat. Nos. 4,414,310, 4,672,027, 4,693,964 and 4,914,014; Solberg et al U.S. Pat. No. 4,433,048; the Maskasky patents cited above; and Piggin et al U.S. Pat. Nos. 5,061,609 and 5,061,616, the disclosures of which are here incorporated by reference. Examples of preferred tabular grain emulsions other than silver bromoiodide emulsions are provided by *Research Disclosure*, Item 308119, above Section I, sub-section A, and Item 22534, both cited above.

Since the presence of iodide in grain structures increases their native blue sensitivity, in the preferred form of Structure II shown above the blue recording layer unit is located farthest from the support to receive exposing radiation prior to the remaining green and red recording layer units. Although Kofron et al, cited above, has taught the feasibility of relying on the high minus blue (i.e., green and/or red) to blue sensitivity ratios of high aspect ratio tabular grain silver bromoiodide emulsions to minimize blue contamination when blue, green and red recording layer units are coated in any sequence, for minimal blue contamination of the minus blue records, it is preferred to locate these recording layer units beneath the blue recording layer unit (allowing that unit to first intercept blue light) and to incorporate a conventional processing solution decolorizable yellow (blue absorbing) dye in at least Interlayer #1 and preferably in both Interlayers #1 and #2. Note that the incorporation of Carey Lea silver (CLS) in the interlayers is not preferred, since silver bleaching, necessary for CLS removal, is omitted.

To maximize native blue absorption by silver bromoiodide tabular grains in the blue recording layer unit, it is often preferred to employ thicker tabular grains with a 0.5 $\mu$m thickness parameter replacing the 0.3 $\mu$m thickness parameter described above. Increased tabular grain thicknesses result in the blue recording layer unit exhibiting lower mean aspect ratios, often down to 3 or lower, and lower tabularities, often down to 8 or lower.

In addition to processing solution decolorizable yellow dye, Interlayers #1 and #2 preferably additionally contain an oxidized developing agent scavenger. This avoids oxidized developing agent wandering from one recording layer unit to the next and thereby contaminating the dye image record of the adjacent recording layer unit. Oxidized developing agent scavengers are described in *Research Disclosure*, Item 308119, cited above, Section VII, sub-section I.

When the recording layer unit located between the two remaining recording layer units is constructed to rely on silver density alone for latent image recording (that is, no image dye is formed in this layer), the green recording layer unit as shown in Structure II, oxidized developing agent scavenger can be incorporated throughout the intermediately located recording layer unit. It is also possible to incorporate the decolorizable yellow dye in this layer unit. When the components of the interlayers are incorporated in the intermediately located recording layer unit, it is possible to omit one or both of the interlayers. Interlayer #2 has the least effect on performance when omitted. In the preferred form of the invention, at least Interlayer #1 is present, even when the decolorizable yellow dye and oxidized developing agent scavenger are present in the intermediately located recording layer unit.

A conventional processing solution decolorizable antihalation layer is shown coated on the surface of the transparent film support opposite the emulsion layer units. Alternatively, the antihalation layer can be located between the red recording layer unit and the support. At the latter location it is more effective in improving image sharpness, since reflection at the interface of the red recording unit and the support is minimized, but at this location it is also less accessible to the processing solutions. Specific examples of antihalation materials and their decoloration are provided by *Research Disclosure*, Item 08119, cited above, Section VIII, sub-sections C and D. An antihalation layer is a preferred feature, but not essential to imaging.

A preferred procedure for photographically processing Structure II in its imagewise exposed form is to employ the Kodacolor C-22 TM, the Kodak Flexicolor C-41 TM or the Agfacolor TM process, each described in the *British Journal of Photography Annual*, 1977, pp. 201–205, the disclosure of which is here incorporated by reference, but with the modification that the step of bleaching the silver image is omitted. Note that the step of fixing out the undeveloped silver halide grains is preferably performed, since retained grains exhibit a large refractive index mismatch with the surrounding photographic vehicle and are therefore prone to scatter radiation used to scan the negative.

A detailed description of one approach for extracting from a photographic element satisfying the requirements of Structure II three image density records and converting these records to three image records, each corresponding to the latent image in one of the three recording layer units, is provided in the Examples below and, to avoid duplication, is not redescribed here. An alternative conversion approach is to scan the negative at three different wave-lengths—within the half peak absorption bands of the two image dyes and in a spectral region of silver absorption and minimal image dye density. The results of these three scans at each point can be converted to three latent image records using a look up procedure wherein the three image density records at a selected point are matched to an identical set of three image density records produced by a known exposure of a photographic element. By taking a test sample of the film, exposing it with a representative sample of possible exposures and recording the image density records produced by each exposure, subsequent determination of an unknown exposure of the photographic film can be easily accomplished by a simple look up operation. $N+1$ (in Structure II, $N=2$, where N is the number of image dye records) image density records at a pixel location are sufficient to identify the exact combination of $N+1$ latent images that were formed at that pixel location. Still other conversion techniques will be apparent to those skilled in the art based on the disclosure above.

Each recording layer unit requires only one silver halide emulsion layer. Superior imaging records are generally recognized to be obtainable when a recording layer is sub-divided into two or three superimposed emulsion layers differing in speed. Both slow over fast and fast over slow coating sequences are known and can be applied to the practice of the invention. The fast over slow arrangements enhance photographic speed, whereas slow over fast arrangements maximize image detail.

The visible spectrum, extending from 400 to 700 nm is sub-divided into blue (400 to 500 nm), green (500 to 600 nm) and red (600 to 700 nm) band widths. Despite the numerical equality of the band widths, the human eye obtains a large majority of its image information from the green and very little from the blue. It is therefore common practice to construct a silver halide photographic element so that the best quality of the three latent images is in the green recording layer unit. This often results in incorporating at least one more silver halide emulsion layer in the green recording layer unit than is incorporated in the blue recording layer unit. For example, a blue recording layer that contains one or two emulsion layers is often paired with a green recording layer unit that contains two or three emulsion layers.

In classical color photography the image dyes produced in the various emulsion layers recording in the same region of the spectrum are indistinguishable. This does not allow the imaging contributions of these emulsion layers to be separately recorded. In the present invention the hue of the various image dyes in the color negatives can be selected independently of spectral band of exposure. This allows the contribution of each of plural emulsion layers that form latent images within a common portion of the spectrum to be independently recorded. This in turn presents an opportunity for improved image definition that has not heretofore been realizable.

Structure III, described below, demonstrates one of numerous possible embodiments allowing plural independent latent image records to be obtained from emulsion layers recording within a shared portion of the spectrum. Structure III satisfies all of the requirements of the general discussion of Structure I and features not explicitly otherwise described preferably conform to the comparable features of Structure II described above.

---

Structure III
(a preferred embodiment)

Blue Recording Layer Unit
Interlayer #1
Fast Green Recording Layer Unit
Interlayer #2
Fast Red Recording Layer Unit
Interlayer #3
Mid Green Recording Layer Unit
Interlayer #4
Mid Red Recording Layer Unit
Interlayer #5
Slow Green Recording Layer Unit
Interlayer #6
Slow Red Recording Layer Unit
Antihalation Layer
Transparent Film Support
Auxiliary Information Layer

---

The blue recording layer unit, Interlayer #1, Interlayer #2, the antihalation layer and the transparent film support can be identical to the same features of Structure II and require no further description. Interlayers #3 to 6 can be identical to Interlayers #1 and 2, except that with each successive layer the amount of blue light received on exposure is diminished. Consequently each of Interlayers #3 to 6 can, but preferably do not, contain a decolorizable yellow dye.

Structure III differs significantly from Structure II in that a triad of each of the green and red recording layer units replace the one green and one red recording layer unit of Structure II. The layer order arrangement is similar to and imparts the photographic advantages taught by Eeles et al U.S. Pat. No. 4,184,876, the disclosure of which is here incorporated by reference.

The independence of the image dye hue as compared to the spectral band recorded allows a very wide range of choices. The specific illustrative combination of Table I is only one of numerous alternative selections:

TABLE I

| LAYER UNIT | SPECTRAL BAND RECORDED (nm) | IMAGE DYE HALF PEAK ABS. BAND RANGE (nm) |
| --- | --- | --- |
| Blue | <500 | 390–470 |
| Fast Green | 500–600 | 490–520 |
| Fast Red | 600–700 | 530–560 |
| Mid Green | 500–600 | No Image Dye |
| Mid Red | 600–700 | 570–600 |
| Slow Green | 500–600 | 610–640 |
| Slow Red | 600–700 | 650–690 |
| Auxiliary | Near IR | 710–900 |

Referring to Table I it is apparent that each of the three green recording layer units can record within any convenient portion or all of the green spectrum, and each of the three red recording layer units can record within any convenient portion or all of the red spectrum. The half peak absorption band ranges of the image dyes are, however, noncoextensive. As chosen above and as is preferred, the half peak absorption band ranges are each offset from all other half peak absorption band ranges. The individual image dyes chosen can exhibit half peak absorption bands that extend throughout the band range set out, but are preferably of the narrowest feasible half peak absorption that can be conveniently obtained within the allotted absorption band. Note further that while some of the half peak absorption bands are within the same spectral region as sensitivity, others are in an entirely different spectral region. In fact, the half peak absorption bands can be allocated to the recording layer units in any one of all possible combinations. The mid green recording layer unit is shown in Table I to be free of image dye, since a somewhat sharper image can be obtained in the recording layer unit relying on developed silver for image definition, but the recording layer unit lacking image dye can be any one of the various recording layer units. The only essential requirement is that each image dye have a spectral absorption band that allows it to be distinguished from all other image dyes.

The auxiliary information layer is shown in Structure III for the purpose of illustrating (1) that recording layer units can be present in addition to those required to produce the image of the subject being replicated and (2) that the location of recording layer units is not restricted to one side of the support. The auxiliary information layer can be used to incorporate into the photographic element a scannable record usefully stored with the photographic record. For example, the auxiliary information layer can be exposed with a code pattern indicative of the date, time, aperture, shutter speed, frame locant and/or film identification usefully correlated with the photographic image information. The back side (the side of the support opposite the emulsion layers) of the film can be conveniently exposed to auxiliary information immediately following shutter closure concluding imagewise exposure of the front side (the emulsion layer side) of the film.

In Structure III there are 6 image dye records (i.e., N=6) and an additional silver only record for a total of 7 (i.e., N+1) records. From the very broad half peak absorption bands allocated to the blue and auxiliary records it is clearly apparent that the spectral band width of from 390 to 900 nm is broad enough to accommodate a substantially larger number of image dye records while still selecting from among a broad range of conventional imaging dyes. However, 390 to 900 nm is only a fraction of the spectral range that can be accommodated by conventional silver halide photographic element constructions. The minimum practical exposure wavelength of a silver halide photographic element is generally recognized to be about 280 nm, where ultraviolet absorption by gelatin, the most common vehicle for layer construction, becomes significant. Simpson et al U.S. Pat. No. 4,619,892, cited above, discloses contemplated near infrared ranges for silver halide imaging of up to 1500 nm. Thus, an available overall image dye absorption band of from 280 to 1500 nm, a 1220 nm range, is available. For dye chromophore simplicity it is generally preferred to limit the working range of dye absorptions in the near infrared to 900 nm. However, this still leaves more than ample spectral band width to accommodate many more spectrally offset dye images than contained in Structure III. Thus, in the overwhelming majority of applications the simplest construction capable of meeting photographic requirements rather than the available image dye band width controls photographic element construction. If the preferred form of Structure III shown above is expanded to provide three separate blue recording layer units, a total of 9 image dye records (N=9) and one additional silver record for a total of 10 (N+1=10) separate image records are present. At the present stage of photographic imaging, this number of separate records is sufficient to serve adequately even the most demanding imaging requirements. There is not, however, any reason in theory that the number of separate image records in the photographic elements used on the practice of the process of the invention could not be increased, depending upon the future demands of the art for both speed and detail in photographic images.

It is appreciated that the preferred form of Structure III described above is only one of many varied recording layer unit arrangements that can be employed in the practice of the invention. For example, any of the varied Layer Order Arrangements I to VIII inclusive of Kofron et al U.S. Pat. No. 4,439,520, the disclosure of which is here incorporated by reference, are specifically contemplated. Still other layer order arrangements are disclosed by Ranz et al German OLS 2,704,797 and Lohman et al German OLS 2,622,923, 2,622,924 and 2,704,826.

While the invention has been described in terms of photographic elements that produce image dyes that are scanned within the recording layer unit in which they are formed, it is appreciated that, if desired, any one or all of the image dyes can be transferred to a separate receiver for scanning. This allows the transferred dye images to be scanned independently of any silver image. Color image transfer imaging systems easily adapted to the practice of the invention in view of the teachings above are summarized in *Research Disclosure*, Item 308119, cited above, Section XXIII, Item 15162 published November 1976, and Item 12331 published July 1974, the disclosures of which are here incorporated by reference.

Black-and-white prints provide the human eye with only luminance information, while color prints provide the eye with both chrominance and luminance information. The photographic elements employed in the practice of the invention need not and in preferred constructions do not have the capability of themselves displaying chrominance information properly balanced to replicate the natural hues of photographic subjects. While extracting both chrominance and luminance image information from the photographic elements by scanning allows a much broader range of photographic element constructions than are acceptable for classical imaging, the equipment for obtaining a visually acceptable image is not nearly as simple nor widely available as that used in classical photographic imaging. One of the particular advantages of the present invention is that luminance (e.g., black-and-white) images can be obtained that can be accessed either by photographic printing techniques or by comparatively simple single channel scanning techniques that are optimally balanced for viewing, even in those preferred forms in which the chrominance image is not properly balanced for viewing.

The human eye derives slightly more than half its total image luminance information from the green portion of the spectrum. Only about 10 percent of luminance information is derived from the blue portion of the spectrum, and the remainder of luminance information is derived from the red portion of the spectrum. To facilitate access to luminance information the photographic elements employed in the practice of the invention are constructed so that the overall image density in a single spectral region chosen for scanning or printing after imagewise exposure and processing is derived from blue, green and red recording layer units in the same relative order as human eye sensitivity. It is within the routine skill of the art to balance by empirical techniques the densities of the blue, green and red recording layer units in silver halide photographic elements. In the simplest possible construction, assuming identical silver halide emulsions of matched sensitivities in the blue, green and red recording layer units, the relative ordering of silver density can be achieved merely by providing corresponding silver halide coating coverages in the blue, green and red recording layer units and scanning in a spectral region in which image dye density is minimal. When scanning or printing is undertaken in a spectral region of image dye absorption, the developed silver plus image dye densities within the spectral region employed must be balanced.

While achieving an exact match between blue, green and red recording layer unit luminance records and the sensitivity of the human eye in these regions is possible, it is not necessary. The benefits can be largely realized merely by providing a luminance record that approximates the luminance spectral sensitivity profile of the human eye. For an approximately balanced luminance record it is preferred that the blue recording layer unit account for from 5 to 20 percent, the red recording layer unit account for from 20 to 40 percent, and the green recording layer unit account for at least 40 and preferably at least 50 percent of the image density of the luminance record.

EXAMPLES

The invention can be better appreciated by reference to the following specific examples. In each of the examples coating densities, set out in brackets ([ ]) are reported in terms of grams per square meter ($g/m^2$), except as specifically noted. Silver halide coverages are reported in terms of silver. All emulsions were sulfur and gold sensitized and spectrally sensitized to the spectral region indicated by the layer title. Dye-forming couplers and oxidized developer scavenger were dispersed in gelatin solution in the presence of approximately equal amounts of coupler solvents, such as tricresyl phosphate, dibutyl phthalate, or diethyl lauramide.

Example 1

A film was prepared by coating the following layers in the order named on a transparent cellulose triacetate film base.

Layer 1: Antihalation Layer
 Gelatin [1.0];
 An aqueous dispersion of a neutral absorber dye, [0.050].

Layer 2: Red Recording Layer Unit
 Gelatin [1.0];
 Fast red-sensitized silver bromoiodide tabular grain emulsion (6 mole % iodide, mean grain area 0.95 $\mu m^2$, mean grain thickness 0.11 $\mu m$) [0.30];
 Slow red-sensitized silver bromoiodide tabular grain emulsion (3 mole % iodide, mean grain area 0.15 $\mu m^2$, mean grain thickness 0.07 $\mu m$) [0.20];
 Cyan Coupler (1) [0.40].

Layer 3 Interlayer
 Gelatin [1.0];
 Scavenging agent A (see below), 0.10 g/m$^2$ Layer 4 Green Recording Layer Unit
 Gelatin [1.6];
 Fast green-sensitized silver bromoiodide tabular grain emulsion (3 mole % iodide, mean grain area 0.8 $\mu m^2$, mean grain thickness 0.11 $\mu m$) [0.30];
 Slow green-sensitized silver bromoiodide tabular grain emulsion (3 mole % iodide, mean grain area 0.15 $\mu m^2$, mean grain thickness 0.07 $\mu m$) [0.50];
 Scavenging agent A, [0.30].

Layer 5: Interlayer
 Gelatin [1.0 ];
 Yellow filter dye (an aqueous dispersion removable on processing) [0.20];
 Scavenging agent A [0.10 ].

Layer 6: Blue Recording Layer Unit
 Gelatin [1.0];
 Fast blue-sensitized silver bromoiodide tabular grain emulsion (3 mole % iodide, mean grain area 1.53 $\mu m^2$, mean grain thickness 0.11 $\mu m$) [0.10];
 Mid blue-sensitized silver bromoiodide tabular grain emulsion (3 mole % iodide, mean grain area 0.42 $\mu m^2$, mean grain thickness 0.08 $\mu m$) [0.10];
 Slow blue-sensitized silver bromoiodide tabular grain emulsion (3 mole % iodide, mean grain area 0.079 $\mu m^2$, mean grain thickness 0.07 $\mu m$) [0.07];
 Yellow coupler (2) [0.70];
 bis(vinylsulfonyl)methane hardener [0.14].

Layer 7: Supercoat
 Gelatin [1.2 ].

Also present in every emulsion-containing layer were 4-hydroxy-6-methyl-1,3,3A,7-tetraazindene, sodium salt, at 1.25 g per mole of silver, and 2-octadecyl-5-sulphohydroquinone, sodium salt, at 2.4 g per mole of silver. Surfactants were also used to aid in coating.

Scavenging agent A has the following formula:

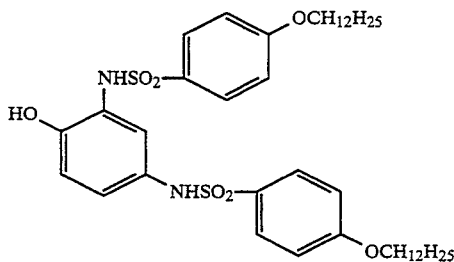

Cyan coupler (1) has the formula:

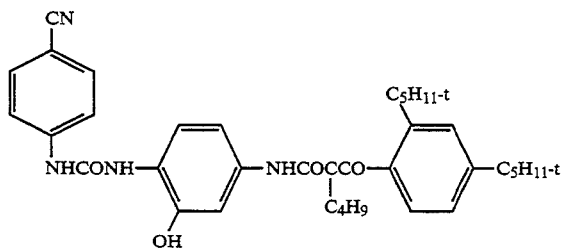

Yellow coupler (2) has the formula:

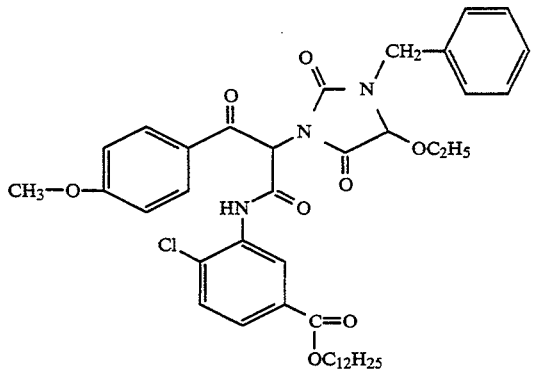

A sample of the film was sensitometrically exposed to white light through a graduated density step wedge, and others were exposed through a graduated density step wedge to light which had been filtered through Kodak Wratten TM #29 (red), #74 (green) and #98 (blue) filters, to give red, green and blue exposures respectively. The film samples were then developed for two minutes in Kodak C41 TM color developer at 38° C., fixed and washed (but not bleached).

Green, red and blue densities of the processed strips were read by an automatic recording densitometer calibrated to measure Status M densities respectively the luminance (overall silver), luminance plus red and luminance plus blue exposure records as registered by the film.

From the separation exposures, the ratio of green density to red density for a red separation record was found to be 0.30 (this represents the density through the green filter due to the silver associated with the cyan dye image plus any density due to side-band absorption by the cyan dye). A good straight line relationship was observed. Similarly, a ratio of green to blue density of 0.15 was determined for the blue separation exposure.

The red, green and blue image densities were then calculated according to the following relationships:

red image density=total red density−luminance density blue image density=total blue density−luminance density green image density=1.45 (luminance density)−0.15 (total blue density)−0.30 (total red density)

(Note: luminance density means the density actually measured through the green Status M filter, and total red and total blue densities mean the densities actually measured through the red and blue Status M filters respectively. Red, green and blue image densities represent the density components of the image which give the color or chrominance information contained in the image).

The computations were carried out electronically, and density vs. exposure curves plotted. The various contrasts were measured from the straight line portions of the curves, and are listed in Table II:

TABLE II

| EX-POSURE | MEASURED CONTRAST | | | CALCULATED CONTRAST | | |
|---|---|---|---|---|---|---|
| | Total red | Lumin-ance | Total blue | Red image | Green image | Blue image |
| Neutral | 0.95 | 0.59 | 1.10 | 0.34 | 0.30 | 0.49 |
| RED SEP'N | 0.77 | 0.23 | 0.20 | 0.52 | 0.06 | 0.0 |
| GREEN SEP'N | 0.50 | 0.44 | 0.52 | 0.0 | 0.39 | 0.07 |
| BLUE SEP'N | 0.11 | 0.14 | 0.79 | 0.0 | 0.06 | 0.54 |

Example 2

A photographic film useful for the practice of the invention was prepared by coating onto a transparent photographic film support. A processing solution decolorizable anti-halation layer was coated on the back side of the film support. The yellow filter dye coated in Layer 4 (Interlayer 2) was dispersed in a microcrystalline form in gelatin and was decolorized during photographic processing.

The layers of the photographic film are numbered in sequence, starting at the surface of the film support:

Layer 1: Red Recording Layer Unit
  Gelatin [1.0];
  Fast red-sensitized silver bromoiodide tabular grain emulsion (5.2 mole % iodide, mean grain projected area 1.77 $\mu m^2$, mean grain thickness 0.11 $\mu m$) [0.20];
  Mid red-sensitized silver bromoiodide tabular grain emulsion (2.6 mole % iodide, mean grain projected area 0.38 $\mu m^2$, mean thickness 0.11 $\mu m$) [0.15];
  Slow red-sensitized silver bromoiodide nontabular multiply twinned grain emulsion (4.8 mole % iodide, mean grain ECD 0.28 $\mu m$) [0.21];
  4-Hydroxy-6-methyl-1,3,3A, 7-tetraazindene, sodium salt [0.011];
  2-Octadecyl-5-sulfohydroquinone, potassium salt [0.0017];
  Cyan dye-forming coupler (1) [0.4].
Layer 2: Interlayer 1
  Gelatin [1.0];
  Scavenging agent A [0.1];
Layer 3: Green Recording Layer Unit
  Gelatin [2.08];
  Fast green-sensitized silver bromoiodide tabular grain emulsion (5.2 mole % iodide, mean grain projected area 1.77 $\mu m^2$, mean grain thickness 0.11 $\mu m$) [0.50];
  Mid green-sensitized silver bromoiodide tabular grain emulsion (2.6 mole % iodide, mean grain projected area 0.38 $\mu m^2$, mean grain thickness 0.11 $\mu m$) [0.23];
  Slow green-sensitized silver bromoiodide nontabular multiply twinned grain emulsion (4.8 mole % iodide, mean ECD 0.28 $\mu m$) [0.33];
  Scavenger A [0.1];
  4-Hydroxy-6-methyl-1,3,3A,7-tetraazindene, sodium salt [0.018];
  2-Octadecyl-5-sulfohydroquinone, potassium salt [0.0028];
Layer 4: Interlayer 2
  Gelatin [2.15];
  Scavenging agent A [0.1];
  Yellow filter dye (3) [0.16];
Layer 5: Blue Recording Layer Unit
  Gelatin [1.0];
  Fast blue-sensitized silver bromoiodide tabular grain emulsion (5.1 mole % iodide, mean grain projected area 3.46 $\mu m^2$, mean grain thickness 0.11 $\mu m$) [0.10];
  Mid blue-sensitized silver bromoiodide tabular grain emulsion (3.0 mole % iodide, mean grain projected area 0.79 $\mu m^2$, mean grain thickness 0.08 $\mu m$) [0.10];
  Slow blue-sensitized silver bromoiodide tabular grain emulsion (3.0 mole % iodide, mean grain projected area 0.13 $\mu m^2$, mean grain thickness 0.08 $\mu m$) [0.10];
  4-Hydroxy-6-methyl-1,3,3A, 7-tetraazindine, sodium salt [0.005];
  2-Octadecyl-5-sulfohydroquinone, potassium salt [0.0007];
  Yellow dye forming coupler (2) [0.7].
Layer 6: Supercoat
  Gelatin [1.2];
  Matte [0.1];
  Bis(vinylsulfonyl)methane [0.23].

Yellow filter dye (3) had the following formula:

The layers also contained surfactants to facilitate coating.

Samples of the coated film were exposed in a photographic sensitometer using a Daylight balanced light source having a spectral energy distribution approximating a color temperature of 5500° K. passed through either a Kodak Wratten ™ #98 (blue), #99 (green) or #29 (red) filter or no filter (giving blue, green, red, or white light exposures, respectively) and a graduated density step wedge. The exposed film samples were processed according to the following procedure:

1. Develop in Kodak C41 ™ developer at 38° C. (2 minutes).

2. 3% Acetic acid stop bath (1 minute).
3. Wash (3 minutes).
4. Fix in Kodak C41 ™ fixer (4 minutes).
5. Wash (3 minutes).
6. Dry film.

The processed film was identical to a conventional film, except that developed silver had not been removed by bleaching and no selectively green absorbing (magenta) image dye was present in the green recording layer unit. Nevertheless, it was possible to use the art recognized procedures of analytical color densitometry to determine image densities corresponding to the latent images in the photographic element. This was accomplished merely by treating the silver density measured in the green portion of the spectrum as though it were produced by a green absorbing (magenta image dye) for purposes of analysis. The procedure employed is summarized in James *The Theory of the Photographic Process*, 4th Ed., Macmillan, New York, 1977, Chapter 18, particularly sub-section 2 (b), pp. 524–526.

Red, green, and blue densities (RD1, GD1, BD1, respectively) were measured for each of the processed film strips for each level of exposure using a transmission densitometer having a conventional (Status M) calibration. A minimum red, green, and blue film density (RDmin, GDmin, BDmin, respectively) were measured for a processed film strip that received no exposure. The following values were found:

$$RDmin = 0.105$$

$$GDmin = 0.106$$

$$BDmin = 0.176.$$

A second set of red, green, and blue densities (RD2, GD2, and BD2, respectively) were determined by subtracting the RDmin, GDmin, and BDmin values from the measured red, green and blue densities (RD1, GD1, and BD1, respectively) for the film strips that received separation exposures;

$$RD2 = RD1 - RDmin$$

$$GD2 = GD1 - GDmin$$

$$BD2 = BD1 - BDmin.$$

A plot was made of the GD2 and BD2 versus RD2 for every exposure level of the red separation exposure. Best fit lines satisfying the relationships:

$$GD2 = a21 \times RD2$$

$$BD2 = a31 \times RD2$$

were determined either graphically or by standard techniques of linear regression over the range of the plots that were substantially linear. Values found for a21 and a31 were 0.324 and 0.277, respectively. For completeness, note that:

$$RD2 = a11 \times RD2$$

and that a11 is necessarily 1.0.

Plots were made of RD2 and BD2 verses GD2 for each exposure level of the green separation exposure. Best fit lines satisfying the relationships:

$$RD2 = a12 \times GD2$$

$$BD2 = a32 \times GD2$$

were determined either graphically or by standard techniques of linear regression over the range of the plots that were substantially linear. Values found for a12 and a32 were 0.918 and 1.021, respectively. For completeness, note that:

$$GD2 = a22 \times GD2$$

and that a22 is necessarily 1.0.

Plots were made of RD2 and GD2 versus the BD2 for each exposure level of the blue separation exposure. Best fit lines satisfying the relationships:

$$RD2 = a13 \times BD2$$

$$GD2 = a23 \times BD2$$

were determined either graphically or by standard techniques of linear regression over the range of the plots that were substantially linear. Values found for a13 and a23 were 0.198 and 0.277, respectively. For completeness, note that:

$$BD2 = a33 \times BD2$$

and that a33 is necessarily 1.0.

With this information, it is now possible to determine cyan image dye density Dc (corresponding to the latent image in the red recording layer unit), the yellow image dye density Dy (corresponding to the latent image in the blue recording layer unit), and the silver density in the green portion of the spectrum Dgs (corresponding to the latent image in the green recording layer unit). Equations analogous to equation 18.5 of James, cited above, page 525, were written as follows:

(Eq. 1)

$$RD2 = a11(Dc) + a12(Dgs) + a13(Dy)$$

$$GD2 = a21(Dc) + a22(Dgs) + a23(Dy)$$

$$BD2 = a31(Dc) + a32(Dgs) + a33(Dy)$$

By reference to the determinations above it is apparent RD2, GD2 and BD2 are each known values derived from measured densities. Similarly, the values of the "a" series constants a11 to a33 are given above. Therefore, three equations are available containing three unknowns, Dc, Dgs and Dy, allowing simultaneous solution to derive these densities. When the equations are rearranged to solve for Dc, Dgs and Dy, they can be written as follows:

(Eq. 2)

$$Dc = b11(RD2) + b12(GD2) + b13(BD2)$$

$$Dgs = b21(RD2) + b22(GD2) + b23(BD2)$$

$$Dy = b31(RD2) + b32(GD2) + b33(BD2)$$

where the "b" series of constants replace multiterm expressions each including a combination of the "a" series of constants.

In the measurements reported, the "b" series of constants were found by calculation from the "a" series of constants to be as follows:

$b11 = 1.432$ $b12 = -1.429$ $b13 = 0.112$ $b21 = -0.494$ $b22 = 1.887$ $b23 = -0.425$ $b31 = 0.107$ $b32 = -1.531$ $b33 = 1.403$

Plots were made of the Dc, Dgs, and Dy values versus relative log exposure given the film. These plots related input exposure with the film response originating in each individual film record of the photographic element.

A new piece of film was exposed in a photographic exposure device to form a latent image of the photographed scene and photographically processed as described above. The processed film was scanned using an opto-electronic, transmission scanning device having a conventional Status M calibration. This yielded a red, green, and blue density triad for every point measured in the film image. New responses were determined from the red, green and blue density triad for every point measured in the film image. New responses were determined from the red, green, and blue densities following the equations given above subtracting the minimum red, green, and blue densities and converting to individual record responses. The new density values were converted to input exposure values using the plots of Dc, Dgs, and Dy versus relative log exposure described above for the unfiltered calibration exposure.

The derived input exposures for the red, green, and blue imaging records in the film at every point scanned were used to drive a digital display yielding a full color, photographic reproduction of the original scene. This demonstrated the successful conversion of two image dyes and a silver image substituting for a third image dye into a viewable color image corresponding to original subject hues.

Example 3

Example 2 was repeated, except that the fixing step was omitted. Qualitatively similar results were obtained.

The invention has been described in detail with particular reference to preferred embodiments thereof, but it will be understood that variations and modifications can be effected within the spirit and scope of the invention.

What is claimed is:

1. A method of extracting independent spectral image records from an imagewise exposed photographic element that contains superimposed silver halide exposure recording layer units that form latent images in the blue, green and red regions of the spectrum and each form a latent image indicative of exposure to a different one or portion of the blue, green and red regions of the spectrum comprising photographically processing the imagewise exposed photographic element to produce spectrally non-coextensive images, scanning the images produced by photographic processing, and deriving image records corresponding to the latent images from the scanned images, wherein N+1 of the superimposed silver halide exposure recording layer units are present, N ranging from 2 to 9, photographically processing is conducted to produce a silver image in N+1 of the exposure recording units and a dye image distinguishable from other dye images in at least N exposure recording layer units, the photographic element is in one instance scanned in a spectral region of silver absorption and minimal image dye absorption to provide a first image density record, the photographic element is also scanned in N spectral regions each within the half peak absorption band width of a different image dye to provide N additional image density records, and information from the separate image density records is converted to N+1 image records each corresponding to a different latent image in the exposed photographic element.

2. A method according to claim 1 wherein undeveloped silver halide grains remain in the photographic element during the scanning step.

3. A method according to claim 2 wherein each image dye exhibits an absorption equal to half its peak absorption in a portion of the spectrum offset from the spectral region of the latent image of the recording layer unit in which the image dye is formed.

4. A method according to claim 1 wherein undeveloped silver halide grains are removed from the photographic element by photographic fixing prior to scanning.

5. A method according to claim 1 wherein the recording layer units are coated on a reflective support and radiation is reflected from the support during scanning.

6. A method according to claim 1 wherein the recording layer units are coated on a transparent film support and radiation is transmitted through the transparent film support during scanning.

7. A method according to claim 6 wherein at least one of the recording layer units is coated on a side of the film support that is opposite that of the remaining recording layer units.

8. A method according to claim 1 wherein the photographic element contains three recording layer units that each form a latent image upon exposure to a different one of the blue, green and red portions of the spectrum.

9. A method according to claim 1 wherein at least one of the image dyes exhibits an absorption equal to half its peak absorption in a spectral region that lies in the near infrared region of the spectrum.

10. A method according to claim 1 wherein at least one image dye is transferred from a recording layer unit to a separate receiver layer for scanning.

11. A method according to claim 1 wherein the recording layer units include blue, green and red recording layer units each containing at least one silver bromoiodide emulsion.

12. A method according to claim 11 wherein the iodide content of the silver bromoiodide emulsion layers is less than 5 mole percent iodide, based on silver.

13. A method according to claim 14 wherein a processing solution decolorizable yellow filter dye separates the blue recording layer unit from the green and red recording layer units so that during imagewise exposure blue exposure of the green and red recording layer units is minimized and during processing the density of the yellow filter dye is minimized.

14. A method according to claim 1 wherein at least two of the recording layer units contains a different compound that reacts with oxidized developing agent to produce a different dye image and another recording layer unit interposed between the two recording layer units contains an oxidized developing agent scavenger and is itself free of a compound that reacts with oxidized developing agent to produce a dye image.

15. A method according to claim 14 wherein red, green and blue recording layer units are coated on a transparent film support in that order and the green recording layer unit contains oxidized developing agent scavenger.

16. A method according to claim 1 wherein the imagewise exposed and photographically processed photographic element is scanned point by point to record a triad of densities at each point scanned, each scan is additionally extended to an unexposed area of the film, the density recorded in the unexposed area by each scan is subtracted from the density at each point scanned, and the resulting density differences obtained for each point are used to determine the latent image recorded at each point.

17. A method according to claim 1 wherein, during each scanning step, scanning is conducted point by point, the density observed at each point is compared to the density in the same spectral region of adjacent points and any observed point density differing from adjacent compared point densities is adjusted to reduce the difference between the observed density and the mean density of the adjacent point densities compared.

18. A method according to claim 1 wherein a luminance record is extracted from the photographic element based on the overall image densities of the photographic element within a selected region of the spectrum.

19. A method according to claim 18 wherein the luminance record is extracted within a spectral region in which dye image density is minimal.

20. A method according to claim 18 wherein the maximum image density contribution of the green recording layer unit to the luminance record exceeds the maximum image density contributions to the luminance record in either of the blue or red recording layer units.

21. A method according to claim 20 wherein the individual image density contributions of the blue, green and red recording layer units to the overall image density of the photographic element are relatively ordered to the luminance spectral sensitivity of the human eye.

22. A method according to claim 21 wherein the blue recording layer unit contributes from 5 to 20 percent, the red recording layer unit contributes from 20 to 40 percent, and the green recording layer unit contributes at least 40 percent of the overall maximum density of the luminance record.

23. A method according to claim 22 wherein the green recording layer unit contributes at least 50 percent of the overall maximum density of the luminance record.

24. A method of extracting independent spectral image records from an imagewise exposed photographic element that contains three superimposed silver halide exposure recording layer units that form latent images in the blue, green and red regions of the spectrum and each form a latent image indicative of exposure to a different one of the blue, green and red regions of the spectrum comprising,
photographically processing the imagewise exposed photographic element to produce spectrally non-coextensive images,
scanning the images produced by photographic processing, and
deriving image record corresponding to the latent images from the scanned images,
wherein
a different image dye is formed during photographic processing in two of the exposure recording layer units and only a silver image is formed during photographic processing in a third of the exposure recording layer units,
the photographic element is in one instance scanned in a spectral region of silver absorotion and minimal image dye absorption to provide a first image density record,
the photographic element is also scanned in two spectral regions each within the half peak absorption band width of a different image dye to provide two additional image density records, and
information from the separate image density records is converted to three image records each corresponding to different latent image in the exposed photographic element.

25. A method according to claim 24 wherein the image dyes are chosen from among yellow, magenta and cyan dyes.

26. A method of extracting independent spectral image records from an imagewise exposed photographic element that contains superimposed silver halide exposure recording layer units that form latent images in the blue, green and red regions of the spectrum and each form a latent image indicative of exposure to a different one or portion of the blue, green and red regions of the spectrum comprising
photographically processing the imagewise exposed photographic element to produce spectrally non-coextensive images,
scanning the images produced by photographic processing, and
deriving image records corresponding to the latent images from the scanned images,
wherein
N+1 of the superimposed silver halide exposure recording layer units are present, N ranging from 2 to 9,
photographic processing is conducted to produce a silver image in N+1 of the exposure recording layer units and a dye image distinguishable from other dye images in at least N exposure recording layer units,
the photographic element is in one instance scanned in a spectral region of silver absorption and minimal image dye absorption to provide a first image density record,
the photographic element is also scanned in N spectral regions each within the half peak absorption band width of a different image dye to provide N additional image density records, the density of the first image density record is subtracted from the density of each of the N additional image density records to obtain a net dye image density for each of the additional image density records, each net dye image density is then employed to obtain a corresponding silver image density, and the corresponding silver image densities are then subtracted from the first image density record to obtain the silver image density in the recording layer unit that is in addition to the recording layer units providing the N additional image density records, thereby providing N+1 image records each corresponding to a different latent image in the exposed photographic element.

* * * * *